June 16, 1942.   P. D. MERRILL   2,286,751
PIPE LEAK SEALING SLEEVE
Filed Aug. 28, 1941   2 Sheets-Sheet 1

INVENTOR.
PATTERSON D. MERRILL
BY Oltsch & Knoblock
attorneys.

June 16, 1942.    P. D. MERRILL    2,286,751
PIPE LEAK SEALING SLEEVE
Filed Aug. 28, 1941    2 Sheets-Sheet 2
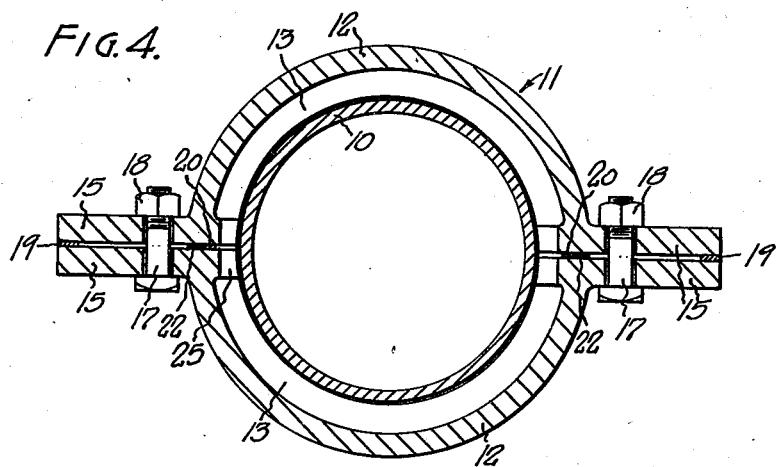
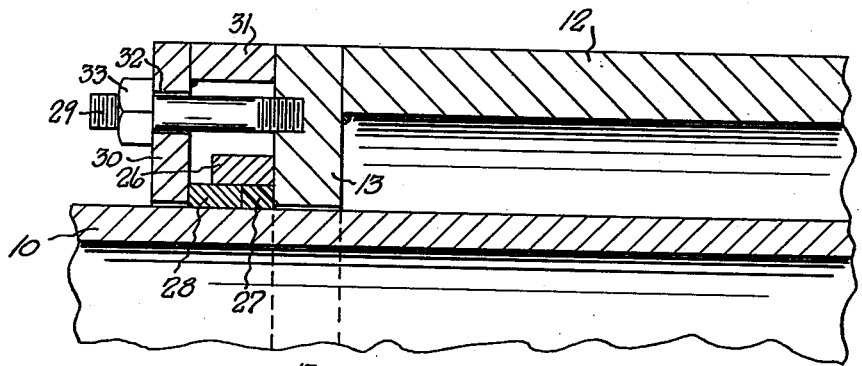
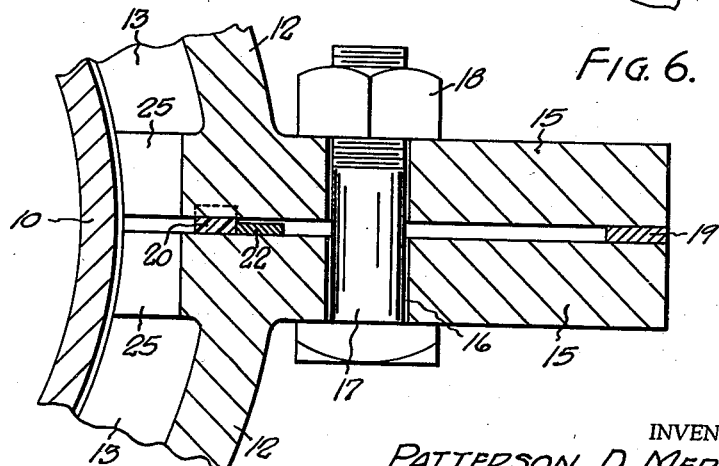
INVENTOR.
PATTERSON D. MERRILL.
BY Altsch & Knoblock
Attorneys.

Patented June 16, 1942

2,286,751

UNITED STATES PATENT OFFICE 2,286,751

PIPE LEAK SEALING SLEEVE

Patterson D. Merrill, South Bend, Ind., assignor to M. B. Skinner Company, South Bend, Ind., a corporation of Indiana Application August 28, 1941, Serial No. 408,599

6 Claims. (Cl. 138—99)

This invention relates to pipe leak sealing sleeves primarily adapted for use to encircle the leaking portion of a pipe to seal the leak.

Sleeves of this type are assembled from arcuate segments having longitudinal sealing gaskets at the joints between segments, and ring gaskets fit within the ends of the sleeve and around the pipe and are engaged by the ends of the gaskets between the segments of the sleeve. The segments of the split sleeve are provided with longitudinal flanges projecting outwardly from their longitudinal margins and the longitudinal sealing gasket is interposed between each pair of opposed flanges to be compressed by said flanges when said flanges are clamped together by bolts or other connecting means. Heretofore, this type of sleeve construction has been effective where the pressure of the fluid leaking from the pipe repaired by the sleeve has been small, that is, not greatly in excess of 100 pounds per square inch. At higher pressures, i. e. pressures in the range between 300 and 1000 pounds per square inch, the use of this type of split sleeve has failed because of leakage occurring at the joints between the segments of the sleeve and at the ends of the sleeves. The reason for this failure at the sleeve joints has generally been that the gaskets between the segments could not be sufficiently compressed to enable them to withstand the high pressures above mentioned. Particularly, it has been found that tightening of the bolts connecting the longitudinal sleeve flanges is effective to compress the gaskets only to a certain point, and tightening of the bolts beyond that limit serves only to flex or bend the flanges and does not proportionately increase gasket compression. Leakage at the annular end gaskets results from the use of a unitary end clamping ring whose large diameter frequently entails surface irregularities when formed from a casting and also entails other conditions rendering uniform application of a gasket compressing force ample to withstand high pressures of the character above mentioned exceedingly difficult to achieve.

By means of the present invention, it becomes possible for the first time to provide a sleeve construction by which a gasket can be sufficiently compressed to form a seal against pressures in a range of from 300 to 1000 pounds per square inch. The present invention achieves this result by forming the normally rigid gasket compressing flanges on the longitudinal margins of the sleeve segments of a width sufficient to permit insertion therebetween at each joint of a non-compressible fulcrum strip thinner than the gasket and extending along the outer marginal portion thereof in outwardly spaced relation to the gasket and to the bolts connecting the flanges.

The invention further contemplates the provision of a strip interposed between the outer marginal portions of opposed longitudinal flanges of adjacent sleeve segments and a gasket confining strip of a thickness less than the fulcrum strip interposed between said flanges in engagement with the outer edge the gasket between the inner marginal portions of said flanges. The invention also includes the use, in a sleeve of this character, of a plurality of equi-spaced clamping elements adjustably secured at each end thereof, which bear against a gasket compressing ring and are fulcrumed against the end of the sleeve at a point spaced from said ring and in opposed relation thereto with respect to the securing means therefor.

Other objects and advantages of the invention will be apparent from the description, drawings, and appended claims.

In the drawings:

Fig. 4 is a transverse sectional view of the sleeve taken on line 4—4 of Fig. 1.

Fig. 5 is an enlarged fragmentary sectional detail view taken on line 5—5 of Fig. 2.

Fig. 6 is an enlarged fragmentary sectional detail view taken on line 4—4 of Fig. 1.

Figure 1:
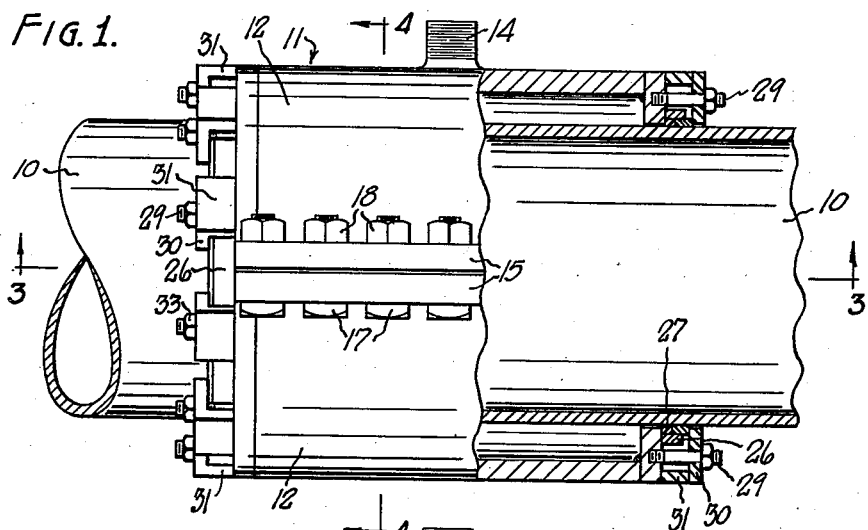
Fig. 1 is a side view of a sleeve applied to a pipe, with parts of the pipe and the sleeve shown in section.
Figure 2:
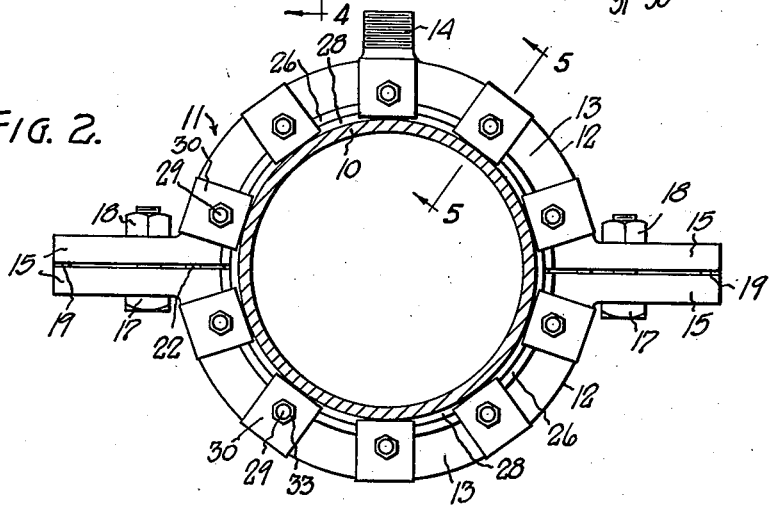
Fig. 2 is an end view of the sleeve illustrating the manner in which the same is applied to a pipe which is illustrated in cross section.

Referring to the drawings which illustrate the preferred embodiment of the invention, the numeral 10 designates a pipe having a leaking portion (not shown). A sealing sleeve 11 is adapted to be applied to the pipe to encircle the leaking portion of said pipe. The sleeve 11 is formed of two or more complementary longitudinal segments 12 from whose opposite ends extend inwardly projecting annular end portions 13. The inner diameter of the annular end portions 13 is preferably slightly greater than the outer diameter of the pipe 10 to facilitate mounting of the sleeve upon the pipe. One of the sleeve segments 12 may be provided with an externally screw threaded transversely outwardly projecting collar 14 if desired.

At each longitudinal edge of each sleeve sgement 12 is provided a wide, rigid, outwardly projecting, longitudinal flange 15. The flanges 15 preferably have substantially plane inner surfaces, and their inner edges conform to the contour of the sleeve and its end portions 13 which abut thereagainst and project therefrom. Bolt holes 16 are formed in equi-spaced relation along the length of flanges 15 and are positioned in inwardly spaced relation from the outer margins of said flanges 15. When the sleeve segments 12 have been positioned to encircle pipe 10 and are brought into register, the openings 16 in the opposed or facing flanges of adjacent segments will register to receive bolts 17 which mount nuts 18 to clamp the flanges 15 together.

One of the flanges 15 of each pair at each joint fixedly mounts, at the outer margin of its inner face, a longitudinally extending metal fulcrum strip 19 whose inner edge is outwardly spaced from the bolts 17. An elongated gasket strip 20 is interposed between the inner marginal portions of each pair of facing flanges 15 and is preferably provided with terminal portions 21 bent radially inwardly to follow the shape of the inner edges of said flanges and to extend across the inwardly projecting portion 25 thereof. The gasket strip 20 may be formed of rubber, synthetic rubber, or any other suitable compressible sealing material. The thickness of the gasket strip 20 is substantially greater than the thickness of the fulcrum strip 19, as best illustrated in dotted lines in Fig. 6. Hence, the operation of tightening the clamping bolts to interconnect the segments will serve to compress the gasket 20 to a predetermined extent, for example, an extent sufficient to permit the gasket to sustain a pressure of several hundred pounds per square inch, before the fulcrum strip 19 is engaged by the flange 15 opposite that which carries said fulcrum strip. Further tightening of the bolts, after the fulcrum strip has been engaged as aforesaid, results in forcible flexing of said flanges, fulcrumed by strip 19, to further compress the gasket to permit sealing of pressures at and above 1000 pounds per square inch.

An elongated flat metal gasket-confining strip 22 is secured to one of each pair of facing flanges 15 with its inner edge bearing against the outer edge of gasket strip 20. The end portions 23 of the confining strip 22 are bent to conform to and follow the formation of the outer end portions 21 of the gasket strip 20. The strip 22 is of a thickness slightly less than the thickness of the fulcrum strip 19 whereby a slight clearance occurs between inner face thereof and the face of the opposite flange 15 when the flanges 15 have been brought into the position illustrated in Fig. 6. Thereafter, as the gasket is further compressed and the flanges 15 are flexed relative to the fulcrum strip, the clearance at the confining strip decreases and the proportion of the compressed thickness of gasket 20 engaged by strip 22 increases until, at maximum gasket compression, the flange opposite that carrying strip 22 will approach very close thereto or may come in contact therewith. This action permits the confining strip to assume the additional function of a backing or reinforcing strip, and makes possible the effective sealing of the joint under pressures at and above 1000 pounds per square inch.

Each of the annular ends 13 of the sleeve is provided with an outwardly projecting annular flange 26 whose inner diameter is greater than the inner diameter of the sleeve end 13 to provide an annular recess outwardly of and concentric with the inner marginal portion of sleeve end 13. An annular gasket 27 fits snugly within each of the recesses defined by the flange 26, sleeve end 13, and the outer periphery of the pipe 10. These gasket receiving recesses are open at their outer ends, and the gaskets 27 are of a thickness permitting them to be slid to place therein after the sleeve 11 has been mounted upon the pipe. The gasket 27 is of a width less than the width of the flange 26. A follower ring 28 which is preferably machined to provide smooth uniform surfaces, and the precise size desired, has a snug sliding fit in each recess between the flange 26 and the pipe 10. Ring 28 is of a width substantially equal to the width of the flange 16 whereby its inner portion extends into the gasket receiving recess to bear against the gasket 27, and its outer portion projects from the recess and terminates in longitudinally spaced relation from the outer edge of flange 26.

A plurality of bolts or studs 29 are fixedly secured to and project longitudinally from the sleeve ends 13 in equi-spaced relation and each positioned intermediate the inner and outer peripheries of the sleeve end 13. As here illustrated, the studs 29 are threaded into the sleeve ends and are provided at their opposite ends with threaded portions. Each of the studs 29 mounts a rigid L-shaped or angle member comprising a radial leg 30 and a longitudinal leg 31. The radial leg 30 of each angle member has an opening 32 formed therein which fits loosely around the stud 29 when the angle member is positioned as illustrated in Fig. 5. The end of leg 31 bears against the outer margin of the sleeve end 13 and the inner face of the end portion of the leg 30 bears against the outer edge of the ring 28. A nut 33 is threaded on the outer end of the stud 29 to secure the angle member to the sleeve and also to force the leg 30 in the direction of ring 28 and the sleeve. It will be noted that the longitudinal leg 31 serves as a fulcrum upon which the angle member tilts bodily when the nut 33 is tightened, and this assures transmission of the stress exerted by the nut 33 directly to the free end of leg 30 and to the follower ring 28 for the purpose of effectively compressing gasket 27 to the full extent required. It will be understood that, as nuts 33 are equally tightened upon the studs 29, the follower ring 28 will be equally inwardly urged at all circumferential points thereof, and a gasket compression will result wherein the gasket 27 will expand to effect a tight seal with the pipe 10, the outer face of the sleeve end 13, and the inner face of the flange 26. It will also be understood that the stud and nut arrangement is illustrative only and that any other suitable securing means, such as bolts threaded into the sleeve end 13 and having heads engaging leg 30 may be used.

Figure 3:
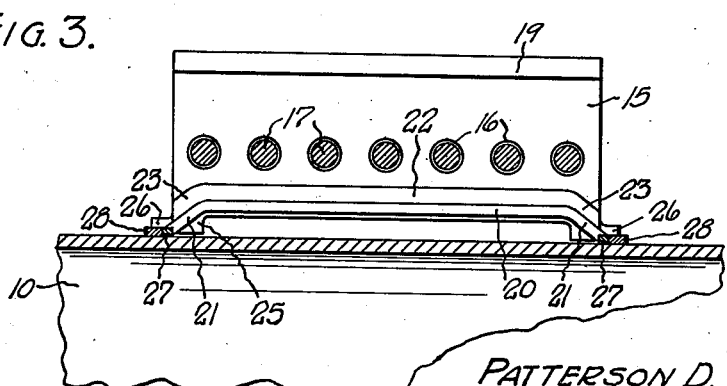
Fig. 3 is a longitudinal sectional view of the sleeve taken on line 3—3 of Fig. 1.

Attention is directed particularly to the fact that the annular gaskets 27 are engaged by the ends of the longitudinal gaskets 20, as best illustrated in Fig. 3, whereby gasket continuity is obtained and no leak points can occur at the joints and especially at joint intersections or ends.

In the form of the invention shown, the sleeve segments 12, end portions 13, longitudinal flanges 15, and annular end flanges 26 are all separately formed and are welded together; and it is understood that this is illustrative only, and that the sleeve segments may be fabricated or formed in any convenient and desired manner, as by stamping, forging, or casting.

I claim:

1. In a pipe leak sealing device of the type including a split sleeve adapted to encircle a pipe and provided at each end with an annular recess for an annular pipe-engaging gasket and with means for compressing said annular gaskets, in combination, a split sleeve formed of arcuate rigid segments, rigid radially outwardly projecting flanges at each longitudinal edge of each segment, an elongated compressible gasket strip interposed between each pair of opposed flanges at the inner marginal portions thereof, a metal fulcrum strip of a thickness less than the thickness of said strip gasket interposed between the outer marginal portions of each pair of opposed flanges, and a plurality of longitudinally spaced clamping bolts interconnecting each pair of opposed flanges and positioned intermediate said fulcrum strip and gasket.

2. A device as defined in claim 1, and an elongated metal backing strip secured to one flange of each opposed pair and engaged by the outer edge of said gasket strip, said backing strip being of a thickness less than the thickness of said fulcrum strip.

3. In a pipe leak sealing device, a sleeve adapted to encircle a pipe, said sleeve being formed of longitudinally divided segments each provided with a rigid out-turned longitudinal flanges, a rigid non-compressible fulcrum strip projecting from the outer marginal portion of the inner face of one flange of each segment, clamping members interconnecting opposed flanges of adjacent segments in inwardly spaced relation to said fulcrum strip, and an elongated compressible gasket strip of a thickness greater than said fulcrum strip interposed between said opposed flanges along the inner marginal portions thereof.

4. In a pipe leak sealing device of the type including a pipe-encircling sleeve sealed at its ends by annular gaskets fitting between said sleeve and pipe, in combination, a longitudinally split sleeve formed of rigid segments each having rigid, radial, substantially plane surfaced flanges at its longitudinal edges, means for applying a substantially continuous uniform clamping action upon opposed flanges of adjacent segments throughout the length thereof, a compressible gasket strip interposed between the inner marginal portions of each pair of opposed flanges and bearing against said annular gaskets at its ends, a rigid gasket-confining strip secured to one flange of each pair inwardly of said clamping means and engaging the outer edge of said gasket strip, and a rigid metal fulcrum strip secured to one flange of each pair in outwardly spaced relation to said clamping means, said fulcrum strip being thicker than said backing strip, and thinner than said gasket strip.

5. A pipe leak sealing device comprising a longitudinally split rigid sleeve, annular rigid end members projecting inwardly from each end of said sleeve, an annular rigid flange projecting longitudinally outwardly from each end member in outwardly spaced relation to the inner periphery of said end member, to define a recess, a compressible gasket ring fitting in each recess, a rigid compression ring having a snug sliding fit within said recess, and bearing against said gasket ring, a plurality of equi-spaced rigid angle members each having an apertured radial leg bearing against said compression ring and a longitudinal leg bearing against said end member, a plurality of longitudinal studs secured to each end member and each extending through the apertured radial leg of an angle member, a nut threaded on each stud to bear against the radial leg of the adjacent angle member, a rigid flange projecting outwardly from each longitudinal edge of each sleeve segment, a compressible gasket strip interposed between the inner margins of each pair of opposed longitudinal flanges, with its ends engaging said annular gaskets, a non-compressible fulcrum strip thinner than said gasket strip interposed between the outer margins of each pair of opposed flanges, a plurality of longitudinally spaced draw bolts connecting each pair of opposed longitudinal flanges in inwardly spaced relation to said fulcrum strip.

6. A pipe leak sealing device as defined in claim 5, and a rigid metal backing strip of a thickness less than said fulcrum strip secured to the inner face of one flange of each segment and engaged by the outer edge of the adjacent gasket strip.

PATTERSON D. MERRILL.